United States Patent
Lundstedt et al.

(10) Patent No.: US 9,599,051 B2
(45) Date of Patent: Mar. 21, 2017

(54) METHOD OF CONDITIONING A PARTICLE FILTER

(71) Applicants: Björn Lundstedt, Lerum (SE); Styrbjörn Törngren, Göteborg (SE)

(72) Inventors: Björn Lundstedt, Lerum (SE); Styrbjörn Törngren, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/435,756

(22) PCT Filed: Nov. 9, 2012

(86) PCT No.: PCT/EP2012/004660
§ 371 (c)(1),
(2) Date: Apr. 15, 2015

(87) PCT Pub. No.: WO2014/071961
PCT Pub. Date: May 15, 2014

(65) Prior Publication Data
US 2015/0285173 A1    Oct. 8, 2015

(51) Int. Cl.
*F02D 41/00* (2006.01)
*F01N 9/00* (2006.01)
(Continued)

(52) U.S. Cl.
CPC ........... *F02D 41/029* (2013.01); *F01N 3/025* (2013.01); *F01N 3/0253* (2013.01); *F01N 9/002* (2013.01);
(Continued)

(58) Field of Classification Search
CPC .. F02D 41/029; F02D 41/0285; F02D 41/027; F02D 41/0235; F01N 9/002;
(Continued)

(56) References Cited

U.S. PATENT DOCUMENTS

2005/0039440 A1* 2/2005 Kitahara ............... F02D 41/027
60/274
2007/0295316 A1* 12/2007 Davis .................... F02D 19/027
123/689
(Continued)

FOREIGN PATENT DOCUMENTS

CN    1701169 A    11/2005
CN    102770635 A    11/2012
(Continued)

OTHER PUBLICATIONS

Rakovec, N. et al.: 11 Micro-scale Study of DPF Permeability as a Function of PM Loading11—SAE Technical Papers. vol. 2011-01-0815. Dec. 4, 2011 (Dec. 4, 2011). XP002701492. figures 4. 7; tables 3.4 pp. 916-920.
(Continued)

*Primary Examiner* — Mahmoud Gimie
(74) *Attorney, Agent, or Firm* — WRB-IP LLP

(57) ABSTRACT

A method of conditioning a particle filter provided for receiving exhaust gases from internal combustion engine is provided and includes providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles is increased compared to the filling rate that would have been achieved with the first engine control mode, determining a soot loading status of the particle filter, and temporarily applying the second engine control mode to the engine based on the soot loading status.

29 Claims, 3 Drawing Sheets

(51) Int. Cl.
*F02D 41/02* (2006.01)
*F01N 3/025* (2006.01)
*F02D 41/38* (2006.01)
*F02D 41/40* (2006.01)
*F02B 37/18* (2006.01)
*F01N 3/035* (2006.01)
*F02D 9/04* (2006.01)
*F02D 19/08* (2006.01)

(52) U.S. Cl.
CPC ....... *F02D 41/027* (2013.01); *F02D 41/0235* (2013.01); *F02D 41/0285* (2013.01); *F01N 3/035* (2013.01); *F02B 37/18* (2013.01); *F02D 9/04* (2013.01); *F02D 19/082* (2013.01); *F02D 41/0055* (2013.01); *F02D 41/3836* (2013.01); *F02D 41/401* (2013.01); *F02D 2200/0812* (2013.01); *Y02T 10/36* (2013.01); *Y02T 10/47* (2013.01)

(58) Field of Classification Search
CPC .. F01N 11/00; F01N 2250/02; F01N 2250/04; F01N 2250/00; F01N 3/025; F01N 3/0253
USPC ............................ 701/102, 108; 60/299, 300
See application file for complete search history.

(56) References Cited

U.S. PATENT DOCUMENTS

| | | | | |
|---|---|---|---|---|
| 2009/0293453 A1* | 12/2009 | Sujan | ...................... | F01N 3/035 60/285 |
| 2011/0146244 A1* | 6/2011 | Farman | ................... | F01N 3/035 60/285 |
| 2011/0146246 A1* | 6/2011 | Farman | ................. | F01N 3/0235 60/286 |
| 2012/0053814 A1 | 3/2012 | George et al. | | |

FOREIGN PATENT DOCUMENTS

| | | |
|---|---|---|
| EP | 1 860 304 A1 | 11/2007 |
| JP | 2010 031799 A | 2/2012 |
| WO | 2006098512 A1 | 9/2006 |
| WO | 2011044967 A1 | 4/2011 |

OTHER PUBLICATIONS

International Search Report (Jul. 24, 2013) for corresponding International application No. PCT/EP2012/004660.
International Preliminary Report on Patentability (Jan. 26, 2015) for corresponding Internationai application No. PCT/EP2012/004660.
Chinese Official Action (Oct. 11, 2016) for corresponding Chinese Application 201280076957.3.

* cited by examiner

METHOD OF CONDITIONING A PARTICLE FILTER

BACKGROUND AND SUMMARY

The present invention relates to a method of conditioning a particle filter provided for receiving exhaust gases from an internal combustion engine.

The invention also relates to an internal combustion engine system, comprising at least one combustion chamber, in which internal combustion takes place, an exhaust gas system connected to said combustion chamber, a particle filter arranged in said exhaust gas system, and a control unit provided with software for controlling at least one combustion control parameter that affects the characteristics of particles emitted together with and carried by exhaust gas from the combustion chamber to the exhaust gas system.

Diesel engines of today are normally equipped with a diesel particle filter arranged in the exhaust gas system connected to the engine. A diesel particulate filter (or DPF) is a device designed to remove diesel particulate matter or soot from the exhaust gas of a diesel engine. Wall-flow diesel particulate filters usually remove 85% or more of the soot, and under certain conditions they can attain soot removal efficiencies of close to 100%. Some filters are single-use, intended for disposal and replacement once full of accumulated soot, ash or other particulate matter. Others are designed to burn off the accumulated particulate either passively through the use of a catalyst or by active means such as a fuel burner which heats the filter to soot combustion temperatures; engine programming to run when the filter is full in a manner that elevates exhaust temperature or produces high amounts of NOx to oxidize the accumulated soot or through other methods. This is known as "filter regeneration". Cleaning is also required as part of periodic maintenance and it must be done carefully to avoid damaging the filter. Failure of fuel injectors or turbochargers resulting in contamination of the filter with raw diesel or engine oil can also necessitate cleaning.

Diesel engines during combustion of the fuel/air mix produce a variety of particles generically classified as diesel particulate matter due to incomplete combustion. The composition of the particles varies widely dependent upon engine type, age, and the emissions specification that the engine was designed to meet. Two-stroke diesel engines produce more particulate per unit of power than do four-stroke diesel engines, as they burn the fuel-air mix less completely. While no jurisdiction has explicitly made filters mandatory, the increasingly stringent emissions regulations that engine manufactures must meet mean that eventually all on-road diesel engines will be fitted with them. In the European Union, filters are expected to be necessary to meet Euro VI heavy truck engine emissions regulations and future requirements on the number of emitted particles presently discussed.

There are a variety of diesel particulate filter technologies on the market. The most common filter is made of cordierite a ceramic material that is also used as catalytic converter supports (cores)). Cordierite filters provide excellent filtration efficiency, are (relatively) inexpensive, and have thermal properties that make packaging them for installation in the vehicle simple. The major drawback is that cordierite has a relatively low melting point (about 1200° C.) and cordierite substrates have been known to melt down during filter regeneration. The second most popular filter material is silicon carbide, SiC. It has a higher (2700° C.) melting point than cordierite. However it is not as stable thermally. Fibrous ceramic filters are made from several different types of ceramic fibers that are mixed together to form a porous media. This media can be formed into almost any shape and can be customized to suit various applications. Some cores are made from metal fibers—generally the fibers are "woven" into a monolith. Such cores have the advantage that an electrical current can be passed through the monolith to heat the core for regeneration purposes. There are also disposable paper cores that are used in certain specialty applications, however without a regeneration strategy. The different types of filters can be divided into coated filters (being coated with a reactive agent thereon) and non-coated filters.

Regeneration is the process of removing the accumulated soot from the filter. This is done either passively (from the engine's exhaust heat in normal operation or by adding a catalyst to the filter) or actively introducing very high heat into the exhaust system. On-board active filter management can use a variety of strategies:

1. Engine management to increase exhaust temperature through late fuel injection or injection during the exhaust stroke
2. Use of a fuel borne catalyst to reduce soot burn-out temperature
3. A fuel burner after the turbo to increase the exhaust temperature
4. A catalytic oxidizer to increase the exhaust temperature, with after injection (HC-Doser)
5. Resistive heating coils to increase the exhaust temperature
6. Microwave energy to increase the particulate temperature All on-board active systems use extra fuel, whether through burning to heat the DPF, or providing extra power to the DPF's electrical system, although the use of a fuel borne catalyst reduces the energy required very significantly. Typically, a computer decides, based on pre-programmed set points, when to activate the regeneration cycle. Set points may be fuel injection history, for example when a predetermined amount of fuel has been consumed since the foregoing regeneration, or when a predetermined time has passed since a foregoing regeneration. The additional fuel can be supplied by a metering pump. Running the cycle too often while keeping the back pressure in the exhaust system low will result in high fuel consumption. Not running the regeneration cycle soon enough increases the risk of engine damage and/or uncontrolled regeneration (thermal runway) and possible DPF failure.

Diesel particulate matter oxidizes at a suitable rate when temperatures above 550 degrees Celsius are attained. This temperature can be reduced to somewhere in the range of 350 to 450 degrees Celsius by use of a fuel borne catalyst. The actual temperature of soot burn-out will depend on the chemistry employed. The start of combustion causes a further increase in temperature. In some cases, in the absence of a fuel borne catalyst, the combustion of the particulate matter can raise temperatures above the structural integrity threshold of the filter material, which can cause catastrophic failure of the substrate. Various strategies have been developed to limit this possibility. Note that unlike a spark-ignited engine, which typically has less than 0.5% oxygen in the exhaust gas stream before the emission control device(s), diesel engines have a very high ratio of oxygen available. While the amount of available oxygen makes fast regeneration of a filter possible, it also contributes to runaway regeneration problems.

Some applications use off-board regeneration. Off-board regeneration requires operator intervention (i.e. the machine is either plugged into a wall/floor mounted regeneration station, or the filter is removed from the machine and placed in the regeneration station). Off-board regeneration is not suitable for on-road vehicles, except in situations where the vehicles are parked in a central depot when not in use. Off-board regeneration is mainly used in industrial and mining applications. Coal mines (with the attendant explosion risk from coal damp) use off-board regeneration if non-disposable filters are installed, with the regeneration stations sited in an area where non-permissible machinery is allowed. Many forklifts may also use off-board regeneration—typically mining machinery and other machinery that spend their operational lives in one location, which makes having a stationary regeneration station practical. In situations where the filter is physically removed from the machine for regeneration there is also the advantage of being able to inspect the filter core on a daily basis (DPF cores for non-road applications are typically sized to be usable for one shift—so regeneration is a daily occurrence).

An inherent characteristic, and drawback, of the diesel particulate filters now on the market is that, in their empty state, i.e. when they are new or when then they have just been regenerated to a certain degree, their capability of trapping small particles, in the nanometer range, is reduced in comparison to when they are in a more filled-up state. Since recent research points in the direction that such small particles, even though they may be only a small fraction of the total weight of particles emitted from the engine, are probably more dangerous to the environment and to living beings than previously expected, this drawback of contemporary filters should be taken into consideration during the design of models of when and how to regenerate diesel particle filters.

The regeneration of a diesel filter may either be partial or full, wherein full regeneration is here referred to as when the weight of remaining particles in the regenerated filter is less or equal to 10% of the maximum weight of particles that can be trapped in said filter. Full regeneration has the advantage of being relatively easy to achieve and that is relatively uncomplicated to establish the conditions for how to achieve it. However, until the filter has been partly refilled after such a full regeneration, the ability thereof to trap smaller particles, within and below the nanometer range, will be reduced, thereby leading to an increased emission of such particles in connection to the regeneration of the filter.

Partial regeneration, on the other hand, is a way of remedying the above-mentioned drawback since the unwanted empty state of the filter is thereby avoided. Partial regeneration is based on the principle that a computer associated to the engine makes a prediction of the filling degree of the filter on basis of the foregoing operation data of the engine. When the filling degree is predicted to be at a certain level (preferably for), regeneration is initiated. However, the regeneration is not completed such that the filter is emptied. Instead the computer is programmed to make a further prediction of the filling degree of the fitter based on the regeneration data and to stop the regeneration when the filling degree is predicted to be at a certain level. This kind of control of the filling degree of the filter has proven to be fairly suitable for non-coated filters. However, for coated filters partial regeneration it is not equally suitable since, on one hand, the latter need to be fully regenerated in order to maintain their best possible functionality, and, on the other hand, the filling degree of such filters is more difficult to establish based on previous operation data of the engine, and that, therefore, after some time the computer will not be able to correctly predict the right filling degree and when to initiate the regeneration.

A method is provided for conditioning a particle filter provided, for receiving exhaust gases from an internal combustion engine, wherein said method comprises the steps of providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to entrap smaller particles is increased compared to the filling rate that would have been achieved with the first engine control mode, and temporarily applying said second engine control mode to the engine as a response to a regeneration of the particle filter or based on a current soot loading status.

Optionally, the method includes also the step of determining said current soot loading status.

Optionally, the second engine control mode is selected as a response to a performed regeneration or comparison of said current soot loading status with a predetermined soot loading status, e.g. when it is established that a predetermined level of soot load, in the filter has been reached.

Regarding the term "regeneration"; the second control mode is applied after regeneration has been performed (actively) or has occurred (passively).

The soot loading status may be referred to as the mass of particulate matter trapped in the particle filter. Alternatively the soot loading, status may be referred to as the efficiency of the filter to entrap particles, in particular the ability of thereof to entrap smaller particles as defined later, which in turn s dependent on the mass of particulate matter entrapped in the filter and the constitution of such particular matter.

The particles the filling rate of which is increased have such physical properties (size, shape and surface properties) that they will be trapped by the filter. Smaller particles have a tendency to adhere to such particles, whereby small particles that would otherwise have passed through the filter will get entrapped by the latter. In other words, the second control mode is such that there will be an increased emission of said particles from a combustion chamber of the engine from which exhaust gases are conducted to the particle filter.

Optionally, a determined low level of the soot loading status initiates applying said second engine control mode to the engine. Accordingly, the second control mode is applied when it is determined that the soot loading in the filter is below a predetermined threshold value.

Optionally, the determined low level of the soot loading status is represented by regenerated particulate filter.

Optionally, the method comprises performing a regeneration of the diesel particle filter.

Optionally said method comprises, before said regeneration applying said first control mode. Preferably, the first control mode is a mode which is different from the control mode applied during the regeneration.

Optionally, said soot loading status is determined by an estimated soot load. In other words, in particular when there is no active regeneration performed, and the filter is assumed to reach a predetermined lower level of soot load as a consequence of the mere operation conditions without any such active performing of regeneration, the triggering, of the application of the second control mode may be based on an estimation of the soot load. The estimation may be based on hours of operation or other operation data of the engine, such as fuel injection history, fuel consumption, etc.

Optionally, said soot loading status is determined by an estimated soot trapping efficiency. In cases in which it is possible to measure or estimate the soot trapping efficiency of the filter, in particular the efficiency thereof of trapping small particles as defined herein, the application of the second control mode may thus be triggered when the estimated or measured particle-trapping efficiency of the filter is below a predetermined threshold value.

Optionally, the second engine control mode is a mode that is applied as a response to a passive or active regeneration of the filter having been performed or occurred. Preferably, the first engine control mode is a major control mode that is applied during most part of the total time of operation of the engine and designed for low emission of particles, i.e. low total mass of soot particles emitted from a combustion chamber of the engine and conducted through an exhaust gas system to the particle filter. The first control mode must not be applied immediate before the regeneration, but according to one example it is. The first engine control mode may include more than one major control mode and may also include transient modes that are applied between further major modes. The first engine control mode thus results in a mean control of said parameter (represented by the contributions of the possible major and transient modes that form part of said first control mode). The second engine control mode alters the control of said parameter compared to this mean value of the first control mode such that said increased filling rate is achieved. The first (and major) engine control mode, that according to prior art would have been applied directly after and/or during, the regeneration is thus temporarily replaced by the second control mode, which makes the filter speed up the retaining of its ability of trapping smaller particles. Smaller particles may be referred to as particles with a diameter<50 nanometers, preferably particles with a diameter<10 nanometers. By temporarily increasing the rate of filling-up of the filter, less total mass of said smaller particles will pass the filter than if the first control mode would have been applied instead of said second control mode. When the filter has regained a predetermined level of trapping small particles, the second control mode is replaced by the first control mode. For an operation cycle between two consecutive regenerations, the first mode is applied for a longer time than the second mode. Preferably, during such a cycle, the first mode is applied substantially longer than the second mode, preferably more than 100 times longer. It is preferred to use the method on an engine arranged in a vehicle adapted for generally constant operation conditions over longer time, preferably a heavy duty truck adapted for long trips at generally constant engine load. In other words, a major part of the distance traveled by such a vehicle or operation time of the engine is done at generally constant engine load, during which the first operation mode is preferably applied. The first and second engine control modes are not to be confused with the changes of said combustion control parameter that are caused by a load request from a driver or auto-pilot, but are different control modes that will result in different control of said combustion control parameter for a given load request.

Optionally, said at least one combustion control parameter is altered such that the mean an size of said particles is increased compared to if the first control mode would have been applied. In other words, even if said control parameter is altered such that the total mass of particles (per stroke) would be the same or even lower than if the first control mode would have been applied, the filter will still be more rapidly filled since the particles are now comparatively larger and will to a higher degree be trapped by the filter and fill the latter. Preferably, however, said control parameter is altered such that a larger total mass of particles per stroke is emitted from the combustion chamber than if the first control would have been applied. The result is an even faster initial filling of the filter such that the latter will improve its ability of also trapping said smaller particles.

Optionally, said at least one combustion control parameter is altered such that the weight ratio between particles with a diameter above 50 nm and particles with a diameter below 50 nm is increased compared to if the first control mode would have been applied. Accordingly, the mass of larger particles emitter per stroke from the combustion chamber is temporarily increased in relation to the mass of smaller particles emitted per stroke from the combustion chamber compared to if the first combustion control mode would have been applied.

Optionally it is preferred that, subsequently to said temporary change to the second engine control mode, the software is brought to change from said second engine control mode to a normal operation control mode in which the mean size of particles carried by the exhaust gas from the combustion chamber to the exhaust gas system is reduced compared to if the second engine control mode would have been applied. According to one example, said first control mode is the normal operation control mode. The normal operation mode may also be referred to as a major operation mode.

Optionally, the second engine control mode is maintained until a substantially improved efficiency of trapping of particles with a diameter<50 nm, preferably with a diameter<10 nm, in said particle filter is achieved compared to when said particle filter is in its newly regenerated state. This means that the second control mode is maintained for several continual strokes of the engine, preferably so many strokes that a detectable improvement of the ability of the filter to trap smaller particles is achieved.

Optionally, the regeneration of the filter is a regeneration in which the temperature of the exhaust gases arriving at said filter is temporarily increased such that the particles trapped therein are consumed in a thermo chemical process and the weight of remaining particles in the regenerated filter is less or equal to 10% of the maximum weight of particles that can be trapped in said filter, i.e. the maximum instantaneous mass of soot particles that can be held by the accommodated by the filter.

Accordingly, the regeneration according to this example is a "complete" or "full" regeneration of the litter, and not a partial one, and as explained previously the present invention is particularly suitable for such an application. However, according to an alternative example, the regeneration is a partial regeneration, i.e. a regeneration after which the remaining mass of particles in the filter is more than 10% of the maximum mass of particles that can be trapped in said filter, but where the level of filling of the filter is assessed to be insufficiently high for enabling the filter of trapping smaller particles to sufficient degree, for example with regard to limits established by emission legislation. Preferably, the particle filter is a coated filter with reactive agent thereon.

Optionally, the duration t of said temporary change to the second control mode is more than 20 seconds, preferably more than 1 minute, and even more preferably more than 3 minutes, and below 1 hour, preferably below 30 minutes, and even more preferably below 20 minutes. Accordingly the following possible ranges are claimed: 20 seconds<t<1 hour, 20 seconds<t<30 minutes, 20 seconds<t<20 minutes, 1 minute<t<1 hour, 1 minute<t<30 minutes, 1 minute<t<20 minutes, 3 minutes<t<1 hour, 3 minutes<30 minutes, 3 minutes<t<20 minutes. Preferably, the second control mode is applied immediately after completed regeneration of the filter.

Preferably, the change to the second control mode is automatic, and implemented by software of a control unit that controls the operation of the engine. The duration of the application of the second control mode is a balancing on basis of the need of entrapment of said smaller particles, possibly regulated by contemporary or future emission legislation, and the advantages of letting the engine run in accordance with a normal operation mode. As soon as the filter has been filled to such a level that the entrapment of smaller particles is at an acceptable level, there should be a change from the second control mode to a normal operation control mode, since the latter is assumed to be a more optimised operation mode with regard to efficiency of the engine and emission of particles from the combustion chamber thereof.

Optionally, said at least one combustion control parameter is one or more of the following parameters: total fuel amount per stroke, number of fuel injections per stroke, fuel injection timing, fuel injection pressure, exhaust gas recirculation (EGR) rate, gas mass flow, fuel blend in the case of plural fuel operation. The invention includes alteration of any of said parameters alone or in combination with each other. By altering one or more of these parameters (compared to the normal operation control mode), the soot emitted from the combustion chamber can go from small and dry particles with low mass/size of single particles to bigger wet particles and conglomerates of particles with higher mass/larger size, whereby the latter type of emissions will increase the filling rate of the filter. A "wet particle" is referred to as particulate matter with hydrocarbon, HC, bound thereto.

Optionally, said at least one combustion control parameter comprises fuel injection pressure, and said pressure is reduced with at least 25% compared to the injection pressure that would have been applied in accordance with said first control mode. The fuel injection pressure is a very efficient way of affecting the amount of larger-sized particles emitted per stroke from the combustion chamber. Reduction thereof will increase the number of larger particles emitted per stroke from the combustion chamber to the diesel particle filter and will therefore increase the rate with which the latter is filled and thereby improve the ability of the latter to trap said smaller particles.

Optionally, said at least one combustion control parameter comprises fuel injection pressure, and said pressure is reduced with at least 35% compared to the injection pressure that would have been applied in accordance with said first control mode.

Optionally, said at least one combustion control parameter comprises fuel injection pressure, and that said pressure is reduced with at least 50% compared to the injection pressure that would have been applied in accordance with said first control mode.

Optionally, said at least one combustion control parameter comprises injection timing, wherein the start of the injection (for each stroke) is delayed compared to if the first control mode would have been applied. Delay of the start of injection, or delay of the start of the first of a plurality of injections per stroke, will lead to particles that are larger in size due to soot formation from longer carbon chains that are not oxidized-burnt in the combustion changer. Accordingly the emission of such particles from the combustion chamber will increase as a consequence of the delayed start of fuel injection. Preferably, the start is delayed with at least 6 crank degrees compared to if the first control mode would have been applied.

Optionally, said at least one combustion control parameter comprises fuel injection timing, wherein the end of the fuel injection is delayed compared to if the first control mode would have been applied. A similar technical effect as for the delayed start of the injection is thereby achieved. If a plurality of injections are applied for each stroke, the end of one or more of these is delayed such that the requested technical effect is achieved. Preferably, the end of fuel injection is delayed with at least 6 crank degrees compared to if the first control mode would have been applied.

Optionally, said at least one combustion control parameter comprises total fuel amount per stroke, wherein said amount is increased compared to if the first control mode would have been applied. Preferably the Air-to-Fuel-Ratio (AFR) is thereby decreased compared to if the first control mode would have been applied. A decrease in AFR will have as a result the same technical effect as described above for injection timing, and will thereby contribute to the requested increase of the rate of filling of the filter. Increase of fuel consumption per stroke (for a given requested load and compared to if the first control mode would have been applied) is preferably achieved by reduction of the boost pressure, measured as overpressure, preferably by more than 50% and preferably during more than 3 minutes compared to if the first control mode would have been applied. Such reduction is preferably achieved by any of the following measures: Active waste gate control, Inlet Throttle control, adjusting a variable geometry turbocharger, activating a compressor discharge function (pipe with controlled valve between turbo compressor pressure side and the inlet side), activating a backpressure device reducing area in exhaust system, changing inlet or exhaust valves operation (valve timing or lift). Preferably, the fuel consumption increase is at least 5% compared to if the first control mode would have been applied.

Optionally, said at least one combustion control parameter comprises EGR rate, and that said rate is increased compared to if the first control mode would have been applied. In other words, the amount of recalculated exhaust gas introduced into the combustion chamber for each stroke is increased compared to if the first control mode world have been applied. Thereby, an increased amount of larger soot particles will be emitted from the combustion chamber, such that the filter is more rapidly filled to a level at which the filter will able to trap also very small particles.

Preferably, the EGR rate is increased compared to if the first control mode would have been applied such that the content of carbon dioxide in the gas introduced into the combustion chamber is increased with 2-4% (absolute measure) The carbon dioxide content may be monitored by measurement of the oxygen content of the gas in the inlet manifold, which is thus reduced with at least 2%

Optionally, the at least one combustion control parameter comprises gas mass flow, and that the gas mass flow is reduced compared to if the first control mode would have been applied. The gas mass flow can be controlled by control of a turbine waste gate (which is then a part of the claimed engine), by control of an exhaust back pressure device (which is then part of the claimed engine), by using a turbine with variable geometry and controlling said geometry thereof, by using, and controlling the operation of an inlet throttle, by using and controlling the operation of a compressor recirculation valve or variable valve actuators on inlet or exhaust side of the combustion chamber, or any combination of these suggested control measures and devices. Reduction of the gas mass flow will result in a decreased AFR as described above.

Optionally, the internal combustion engine is a diesel internal combustion engine and the particle filter is a diesel particle filter. However, it should be noted that without such a limitation introduced into the independent claims, the present invention is not restricted only to diesel engines and diesel filters. Accordingly, in the widest sense of the present invention, any combination of fuel, internal combustion engine and filter, not only diesel-based, that will result in a corresponding problem as the one to which the present invention presents a solution will be within the claimed scope of protection.

Optionally, diesel and gas, preferably methane, are used as fuel during the operation of the engine, wherein said at least one combustion control parameter comprises the diesel/gas ratio, wherein the diesel/gas ratio is increased compared to if the first control mode would have been applied. This is a preferred example of a plural fuel engine. Typically, such an engine operates with a diesel/ratio (per stroke or as a mean value for a larger number of strokes) such that, according to the first control mode, more than 40% of the energy generated upon combustion refers to the combustion of gas, while according to the second control mode less than 20% of the energy generated during combustion refers to combustion of gas. According to one example of the second control mode, only diesel is used as fuel, and combustion of gas, which is to take place in accordance with the first control mode, is zero. These aspects of the invention may be of interest for plural fuel engines, typically diesel-gas engines in which the combusted gas results in emission of very small particles that, for the moment being, is not regarded as critical for the environment, but that may be so in the future. Then a rapid filling of the filter after regeneration thereof may be advantageous also for this kind of engine.

Further, the initially defined internal combustion engine system is provided, wherein said software of the control unit comprises a computer program comprising code means for controlling said at least one combustion control parameter in accordance with the above-defined teaching of the method of the invention. In other words, the computer program is designed so as to initiate application of the second control mode after occurrence of regeneration to a certain level. Preferably the computer program is designed so as to receive operation data from the engine and to control initiation and implementation of the regeneration step when a certain degree of filling of the filter has been predicted by said programme on basis of said operation data.

Operation data may include information regarding engine load, rpm, etc. that has an impact on how fast the filter is filled. The computer programme comprises said software for controlling said at least one combustion control parameter that is altered in accordance with the second engine control mode. Optionally, the computer program emits control signals to any component by means of which said combustion control parameter is directly affected, such as valves by means of which injection pressure and/or timing is affected, valves by means of which fuel amount is affected or valves by means of which EGR rate is affected.

The invention also relates to a computer program product comprising program code means stored on a computer readable medium for performing the control of said at least one combustion control parameter in accordance with the above-defined teaching of the method of the invention when said program is run on a computer.

Finally, the invention also relates to a computer system for implementing the above-defined method of the invention, and comprising, a processor operable to run a computer program comprising code means for controlling said at least one combustion control parameter in accordance with the teaching of the method of the invention.

Further futures and advantages will be present in the following detailed description of examples.

BRIEF DESCRIPTION OF THE DRAWINGS

Hereinafter, examples will be presented with reference to the annexed drawings, on which.

DETAILED DESCRIPTION

Figure 1:
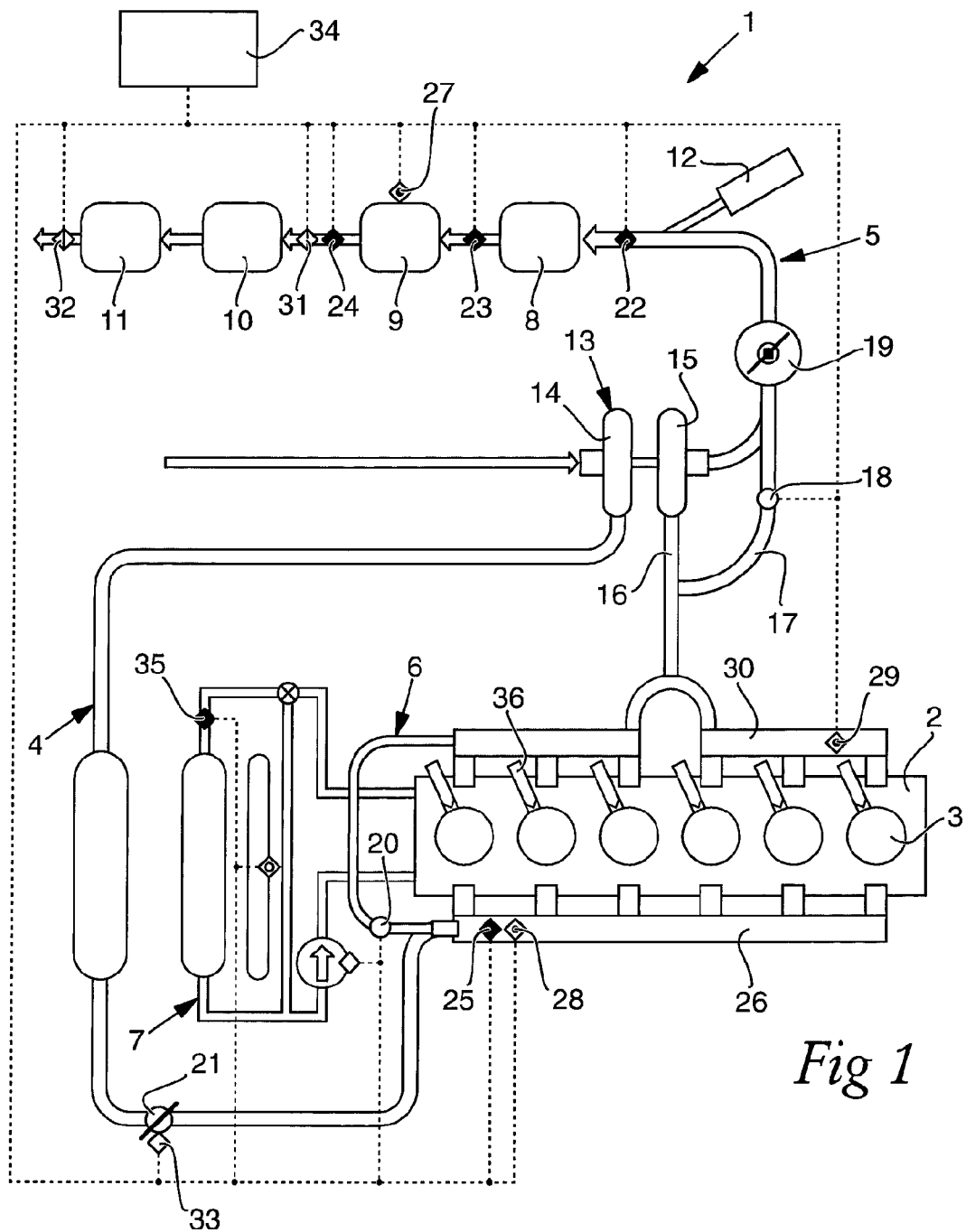
FIG. 1 is a schematic representation of an engine on which the method is applied.

FIG. 1 shows a diesel internal combustion engine system 1. The engine is a plural cylinder engine, with its cylinders arranged in a motor block 2, wherein which each cylinder defines a combustion chamber indicated with 3. Connected to an inlet side of the combustion chambers 3 is an air inlet system 4. Connected to an outlet side of the combustion chambers 3 is an exhaust gas system 5. All exhaust gas recirculation (EGR) circuit 6 forms a branch from the exhaust gas system 5 and is connected to the air inlet system 4 in a way known per se. A cooling system 7 is connected to the motor block 2 for the cooling thereof in a way known per se.

In the exhaust gas system there is provided in series and in the following order, as seen in the gas flow direction from the combustion chamber, a Diesel Oxygen Catalyst (DOC) 8, a Diesel Particle Filter (DPF), 9, a Selective Catalytic Reduction (SCR) unit 10, and a Clean Up Catalyst 11 which removes ammonia from the gas. The DPF 9 is a coated filter with a reactive agent thereon.

Upstream the DPF 9, and here also upstream the DOC 8, the engine 1 is provided a device 12 for the implementation of a regeneration of the DPF 9. The regeneration device 12 comprises a fuel injector by means of which fuel, preferably hydro carbon-based fuel such as diesel, is introduced into the exhaust gas system upstream the DPF 9, such that, during operation of the engine, said fuel is ignited when confronted with the exhaust gas. Thereby, an increase of the temperature of the exhaust gas that reaches the DPF 9 is achieved such that a regeneration of the DPF 9 is implemented.

The engine system 1 also comprises a turbo compressor 13. The turbo compressor is connected with a first compressor 14 to the air inlet system 4 and with a second turbine 15 to the exhaust gas-system 5 for the purpose of increasing the inlet air pressure by means of the exhaust gas-pressure in a way known per se. The turbo compressor 13 is connected to the exhaust gas-system 5 upstream the DPF 9.

In parallel with a branch 16 of the exhaust gas system 5 in which the second turbine 15 of the turbo compressor 13 is arranged there is arranged a bypass branch 17 in which there is provided a controllable waste gate 18 by means of which the exhaust gas pressure that the turbo compressor 13 is subjected to can be affected. By controlling the waste gate 18, combustion control parameters such as boost pressure, air mass flow through the engine and fuel consumption per stroke for a given load can be controlled.

Further, the engine system 1 comprises a back pressure device 19 in the exhaust gas system 5. Here, the back pressure device is arranged downstream the branch 16 in which the second turbine 15 of the turbo compressor 13 is arranged and downstream the bypass branch 17 in which the waste gate 18 is arranged. The back pressure device 19 is arranged so as to affect the cross section of the gas channel of the exhaust gas system 5, and thereby by combustion control parameters such as boost pressure, air mass flow and fuel consumption per stroke for a given load. Preferably it comprises a throttle valve.

In the EGR circuit 6 there is provided an exhaust gas recirculation valve (EGR valve) 20. By means of the EGR valve, the air mass flow through the engine can be controlled. The oxygen supply to the combustion chambers 3, and the preconditions for combustion therein, is thus controlled by means of the EGR valve 20.

In the air inlet system 4 there provided a controllable throttle valve 21 by means of which the flow of air into the combustion chambers 3 of the engine 1 is controlled. By controlling the throttle valve 21, combustion control parameters such as boost pressure, air mass flow and air to fuel ratio can be controlled.

Furthermore, the engine system 1 is provided with controllable fuel injectors 36 by means of which fuel is injected in the combustion chambers 3 thereof. By controlling the timing and length of fuel injection, the combustion in the combustion chambers can be controlled.

The engine system 1 further comprises a first temperature sensor 22 located in the exhaust gas system downstream the device 12 for implementing regeneration and upstream the DOC 8, a second temperature sensor 23 located downstream the DOC 8 and upstream the DPF 9, a third temperature sensor 24 located downstream the DPF 9 and upstream the SCR unit 10. A fifth temperature sensor 35 is arranged in the cooling circuit 7. A sixth temperature sensor 25 is located in the region of an inlet manifold 26 to the combustion chambers 3.

There are also provided a first pressure sensor 27 for measuring the pressure fall over the DPF 9, a second pressure sensor 28 in the inlet manifold 26, and a third pressure sensor 29 in an outlet manifold 30 from the combustion chambers. A first NOx sensor 31 is provided downstream the DPF 9 and upstream the SCR unit 10, and a second NOx sensor 32 is provided downstream the Clean Up Catalyst 11.

To the throttle valve 21 there is connected a position sensor 33 for sensing the position thereof, i.e. to which degree the latter is opened.

The engine system 1 is also provided with a control unit 34 provided with software comprising a computer program for controlling the operation of the engine. The control unit 34 thereby comprises program code means stored on a computer readable medium for performing the control of at least one combustion control parameter of the engine, as well as a processor operable to run a computer program comprising code means for controlling said at least one combustion control parameter. Preferably, as in the embodiment presented here, but not necessarily, the control unit 34 receives input data from each respective of the above-mentioned temperature sensors 22-25 and 35, the pressure sensors 27-29, the NOx sensors 31, 32, and the position sensor 33. The operable connection between the control unit 34 and said sensors, which may be by wire or wireless, is indicated with dotted lines in FIG. 1. Needless to say, there may of course be further sensors provided in the engine 1 that deliver input data to the control unit 34 and on basis of which the latter controls the operation of the engine. The input data may also be used by the programme for the purpose of saving operation history of the engine.

The control unit 34 is in operable connection to at least one of the above-mentioned actuators. In the exemplifying embodiment presented here, the control unit 34 is connected to the device 12 for implementing a regeneration of the DPF 9, the waste gate valve 18, the back pressure device 19, the EGR valve 20 and the throttle valve 21. The operable connection, which may be by wire or wireless, is indicated with dotted lines in FIG. 1. The control unit 34 is in operable connection with said fuel injectors 36 for injection of fuel into the combustion chambers 3. By controlling any of these actuators, the control unit 34 will also control the operation of the engine 1.

The computer program of the control unit 34 comprises a first engine control mode which is a major control mode conceived to be applied during normal operation conditions. The first control mode could thus be regarded as a default mode applied by the program in absence of information of any deviation from predetermined normal conditions.

Furthermore, the computer program comprises a second engine control mode, which is applied by the program as a response to a regeneration of the DPF 9 having been registered by the program. The second control mode is a mode that will thus be automatically applied by the control unit 34 immediately or very shortly after a regeneration of the DPF has been performed. Preferably, the second control mode is applied immediately after the regeneration has been ended or when it has been established or estimated that the soot loading in the DPF 9 has reached a predetermined threshold value, and when the second control mode has been applied for a predetermined time the first control mode is applied. According to the second control mode, at least one combustion control parameter that affects the characteristics of particles emitted together with and carried by exhaust gas from the combustion chambers 3 to the exhaust gas system 5 is altered in relation to the first control mode such that the filling rate of the DPF 9 with particles that will increase the ability of the filter to trap smaller particles is increased compared to the filling rate that would have been achieved if the first control mode would have been applied. As will be seen hereinafter, this alteration may be achieved by an altered control of any of the above-mentioned actuators to which the control unit 34 is in operable connection.

The computer program may also comprise further control modes such as a fault control mode which is applied as a response to any kind of fault (error) indication. Such a fault control mode is however, not a normal operation mode but rather an abnormal operation mode. Typically it includes that the output of the engine is reduced with regard to a required output from an operator. The maximum output of the engine is also typically suppressed during such a fault operation mode. Such a mode is, however, not applied as a response to a regeneration having been performed, but as a response to an kind of fault indication.

Figure 2:
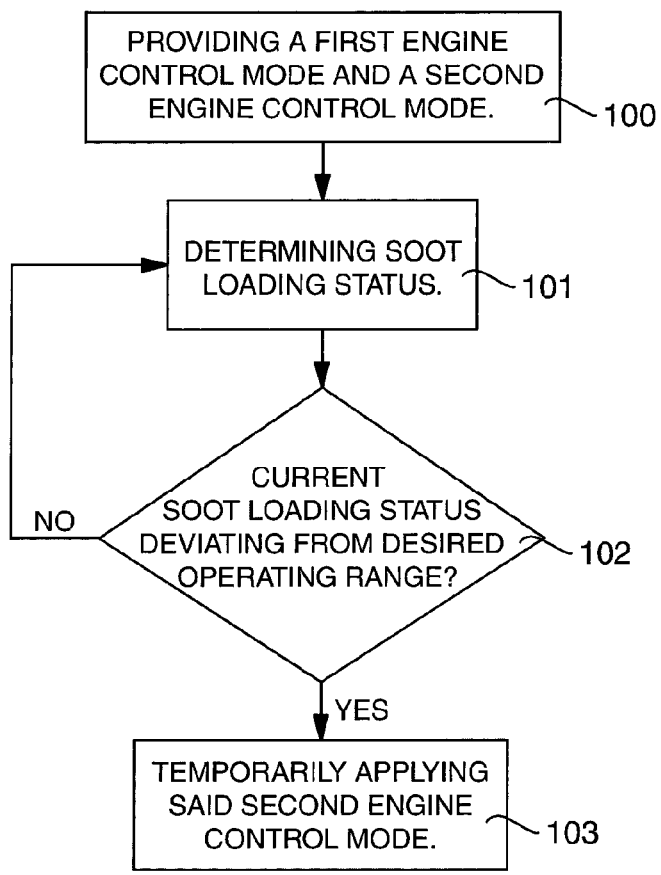
FIG. 2 is a flowchart showing invention first example.

FIG. 2 shows a first example of a method, in which in a first step 100 said first engine control mode and said second engine control mode are provided. Preferably, these modes are provided as part of the computer software of the control unit 34. In a subsequent step 101 a soot loading status is determined on basis of which it is determined by the software in the control unit what control mode to be applied to the engine 1. Preferably, the soot loading status is estimated on a continual basis during operation of the engine, preferably on basis of the engine operation history, i.e. engine operation time (hours), fuel consumption or any other parameter that is representative and may give an indication of the soot loading status. If an active regeneration of the DPF 9 has been performed, this in itself may be regarded as an indication of a predetermined soot loading status. Soot loading status may either be referred to as the mass of soot entrapped in the DPF 9 or the measure or estimated soot trapping efficiency of the DPF 9 at the moment.

The software of the control unit 34 is designed so as determine if the current soot loading status deviates from a desired operating range, 102. If it is established by the control unit 34 that the soot loading status is such that no improvement of the ability of the DPF 9 to entrap small particles is needed, i.e. that the status is within said operating range, a first control mode is applied and determination of soot loading status is repeated on a continual basis. If it is established that an improvement of the ability of the DPF 9 to entrap small particles is needed, as a consequence of the soot load (defined as mass of soot entrapped in the DPF 9) being below a predetermined threshold value, or the soot trapping efficiency being below a predetermined threshold value, the software of the control unit 34 is designed so as to temporarily apply the second control mode, as indicted with box 102. The duration of the application of the second mode is dependent on how the mode is designed and what target that is to be reached. Preferably, the first mode applied as soon as the temporary application of the second mode is ended. As already mentioned, the second control mode differs from the first mode in its different control of at least one combustion control parameter that affects the characteristics of the particles emitted frown the combustion chambers 3. Said parameter may be any of the following parameters: total fuel amount per stroke, number of fuel injections per stroke, fuel injection timing, fuel injection pressure, exhaust gas recirculation (EGR) rate, gas mass flow, fuel blend in the case of plural fuel operation. In the following, presented with reference to FIG. 3, examples are given regarding how these parameters may preferably be altered as a consequence of the application of the second control mode.

Figure 3:
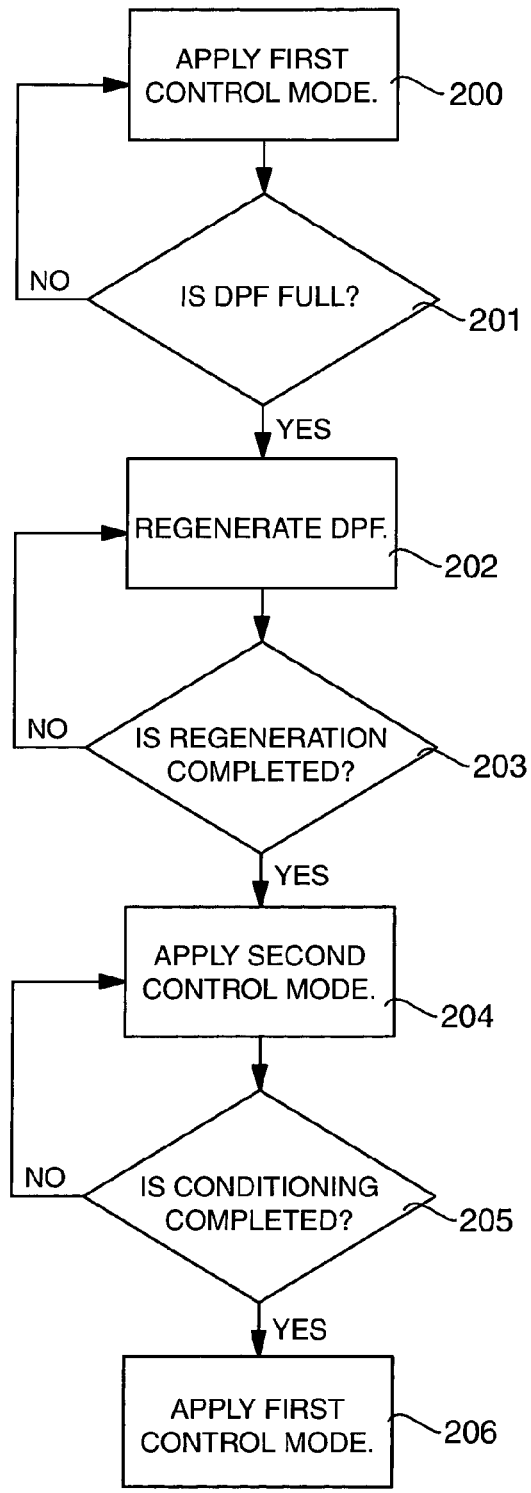
FIG. 3 is a flowchart showing a second example.

FIG. 3 shows a second example of a method. In a first step 200 the computer program of control unit 34 applies the first engine control mode during normal operation of the engine. In a subsequent step 201, the computer program establishes whether the DPF 9 is to be regarded as full, and thereby in need of a regeneration, or not. According to one example, the precondition for an affirmative answer may be that a predetermined engine operation time has lapsed since a nearest foregoing regeneration or since the DPF was originally taken into use in the engine.

Alternatively, the decision is taken on basis of how much fuel that has been consumed since a nearest foregoing regeneration or since the DPF was originally taken into use in the engine. As a further alternative, the decision is taken on basis of fuel injection history, for example number of injections since a nearest foregoing regeneration or since the DPF was originally taken into use in the engine.

If the precondition for regeneration of the DPF 9 is fulfilled, the computer program of the control unit 34 controls the device 12 for implementation of regeneration, step 202. According to one example, this is achieved by controlling the device 12 to inject a diesel fuel into the exhaust gas system 5 upstream the DPF 9 such that a temperature T>450° C. is generated in the DPF 9, whereby soot trapped therein is oxidized and the DPF 9 is regenerated. The question whether regeneration is completed or not is then asked, step 203. According to one example, the regeneration should continue until the weight of remaining particles in the regenerated filter is less or equal to 10% of the maximum weight of particles that can be trapped in said filter. Since it might be difficult to measure the mass of the filter and the soot trapped therein during engine operation, the computer program may be designed so as to decide that this precondition is fulfilled when a predetermined time r has lapsed from the start of the regeneration. Said time t is dependent on filter properties and temperature therein during regeneration. However, a time t>10 minutes would be sufficient in many cases.

After it has been established that sufficient regeneration has been achieved in step 203, the computer program automatically applies the second engine control mode 204 in order to rapidly fill the DPF 9 to a predetermined degree with particles that will increase the ability thereof to trap smaller particles, i.e. particles with a diameter d<50 nm, preferably particles with a diameter d<10 nm.

Optionally, the second control mode differs from the first control mode in that, at least for any engine load down to a lower threshold value requested by an operator/driver or an autopilot, it orders a 50% reduction of the fuel injection pressure compared to if the first control mode would have been applied. According to one example, the second, control mode is applied for approximately 5 minutes. Below said lower threshold value, the reduction ma be less than 50% in order to prevent an excessive reduction in case a very low load is requested and thus the injection fuel pressure will be rather low anyhow.

According to another example, the second control mode differs from the first control mode in that the start of fuel injection (for each respective stroke or seen as a mean difference over a number of strokes) is delayed with 6 crank degrees compared to if the first control mode would have been applied. Delay of the start of injection will lead to particles that are larger in size due to soot formation from longer carbon chains that are not oxidized-burnt in the combustion changer. Accordingly the emission of such particles from the combustion chamber will increase as a consequence of the delayed start of fuel injection. According to one embodiment, the second control mode is applied for approximately 5 minutes.

According to yet another example the second control mode differs from the first control mode in that the end of fuel injection (for each respective stroke or seen as a mean difference over a number of strokes) is delayed with 6 crank degrees compared to if the first control mode would have been applied. According to one example, the second control mode is applied for approximately 5 minutes. A similar effect as when the start of injection is delayed is achieved.

According to yet another example, delayed start of injection is combined with delayed end of injection.

According to yet another example, the second control mode differs from the first control mode in that the waste gate 18 is opened more than if the first control would have been applied. Thereby, the turbo compressor 13 will generate less inlet air pressure, resulting in a reduced air-to-fuel (AFR) ratio during the combustion. The difference in waste gate opening is such that, for a given load of the engine, a fuel consumption increase of approximately 5% is achieved. The second control mode is applied for approximately 5 minutes.

According to yet another example, the second control mode differs from the first control mode in that the back pressure device 19 is controlled such that it increases the back pressure in the exhaust gas system 5 compared to if the first control mode would have been applied. Thereby, the result will be a reduced air-to-fuel (AFR) ratio during the combustion. The difference in degree of closure of the back pressure device 19 compared to if the first control mode would have been applied, is such that, for a given load of the engine, a fuel consumption increase of approximately 5% is achieved. The second control mode is applied for approximately 5 minutes.

According to yet another example, the second control mode differs from the first control mode in that the EGR valve 20 is opened more than if the first control mode would have been applied. Thereby, the difference in degree of opening of the EGR valve 19 compared to if the first control mode would have been applied is such that the EGR rate is increased such that the content of carbon dioxide in the gas introduced into the combustion chamber is increased with 2-4% (absolute measure) The carbon dioxide content may be monitored by measurement of the oxygen content of the gas in the inlet manifold, which is thus reduced with at least 2%. By monitoring the oxygen content in the inlet manifold, the right level of opening of EGR valve 20 can thus be established. Preferably, there are means provided for this purpose and the computer program of the control unit 34 is designed to perform such calculation for the purpose of correctly controlling the opening degree of the EGR valve 20. According to one embodiment, the second control mode is applied for approximately 5 minutes.

According to yet another example, the second control mode differs from the first control mode in that the throttle valve 21 is more closed compared to it the first control would have been applied. Preferably, the difference is such that boost pressure is reduced with 50%, resulting in increased fuel consumption, preferably 5%, for a given requested engine load. According to one embodiment, the second control mode is applied for approximately 5 minutes.

According to yet another alternative example, diesel and methane gas are used as fuel during the operation of the engine. This is a preferred example of a plural fuel engine. Typically, such an engine operates with a diesel/ratio (per stroke or as a mean value for a larger number of strokes) such that, according to the first control mode, more than 40% of the energy generated upon combustion refers to the combustion of the methane gas. The second control mode differs from the first control mode in that the diesel/gas ratio is increased compared to if the first control mode would have been applied. According to the second control mode less than 20% of the energy generated during combustion refers to combustion of gas. According to one embodiment 0% refers to combustion of gas. According to one embodiment, the second control mode is applied for approximately 5 minutes.

In addition to the different examples disclosed above, combinations thereof are conceived and within the concept of the invention. Thus the second control mode may differ from the first control mode in several aspects simultaneously, such as lower fuel injection pressure, a later start and end of fuel injection, a higher EGR rate, a higher back pressure in the exhaust gas system, reduced air pressure, etc.

After established completion of the conditioning of the DPF 9, step 205, the computer program of the control unit 34 returns to applying the first control mode, step 206, and a new operation cycle is started and will proceed similarly to what has been disclosed above. It is assumed that, in absence of any abnormal operation condition, the first control mode will be applied for a considerable time, possibly in the order of 100 hours, before it is decided that a new regeneration of the DPF 9 is to be performed.

The invention claimed is:

1. A method of conditioning a particle filter provided for receiving exhaust gases from an internal combustion engine, wherein diesel and gaseous fuel are used as fuel during the operation of the engine, wherein the method comprises the steps of providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to trap smaller particles is increased compared to the filling rate that would have been achieved with the first engine control mode, and temporarily applying the second engine control mode to the engine after a regeneration of the particle filter or based on a current soot loading status, wherein the at least one combustion control parameter comprises the diesel/gaseous fuel-ratio, wherein the diesel/gaseous fuel-ratio is increased compared to if the first control mode would have been applied.

2. A method according to claim 1, wherein a determined low level of the soot loading status initiates applying the second engine control mode to the engine.

3. A method according to claim 1, wherein the method comprises the step of determining a current soot loading status of the particle filter.

4. A method according to any claim 1, wherein the method comprises performing a regeneration of the particle filter.

5. A method according to claim 1, wherein, before the regeneration, applying the first control mode.

6. A method according to claim 1, wherein the soot loading status is determined by an estimated soot load.

7. A method according to claim 1, wherein the soot loading status is determined by an estimated soot trapping efficiency.

8. A method according to claim 1, wherein the method comprises the step of applying the first engine control mode after the temporary application of the second engine control mode.

9. A method according to claim 1, wherein the first engine control mode is characterized in that a mean size of particles carried by the exhaust gas from the combustion chamber to the exhaust gas-system is reduced compared to if the second control mode would have been applied.

10. A method according to claim 1, wherein the first control mode is a major control mode that is applied during most part of the total time of operation of the engine and designed for low emission of particles.

11. A method according to claim 1, wherein the first control mode is a normal operation control mode.

12. A method according to claim 1, wherein a control unit is provided with software for controlling application of the second engine control mode.

13. A method according to claim 1, wherein the second control mode is maintained until a substantially improved efficiency of trapping of particles with a diameter<50 nm in the particle filter is achieved compared to when the particle filter is in a newly regenerated state.

14. A method according to claim 1, wherein the duration of the temporary change to the second control mode is more than 20 seconds, preferably more than 1 minute, and even more preferably more than 3 minutes, and below 1 hour, preferably below 30 minutes, and even more preferably below 20 minutes.

15. A method according to claim 1, wherein the at least one combustion control parameter is one or more of the following parameters: total fuel amount per stroke, number of fuel injections per stroke, fuel injection timing, fuel injection pressure, exhaust gas recycling (EGR) rate, gaseous fuel-mass flow, fuel blend in the case of plural fuel operation.

16. A method according to claim 1, wherein the at least one combustion control parameter comprises fuel injection pressure, and that the pressure is reduced with at least 25% compared to the injection pressure that would have been applied in accordance with the first control mode.

17. A method according to claim 1, wherein the at least one combustion control parameter comprises fuel injection pressure, and that the pressure is reduced with at least 35% compared to the injection pressure that would have been applied in accordance with the first control mode.

18. A method according to claim 1, wherein the at least one combustion control parameter comprises fuel injection pressure, and that the pressure is reduced with at least 50% compared to the injection pressure that would have been applied in accordance with the first control mode.

19. A method according to claim 1, wherein the at least one combustion control parameter comprises injection timing, and that the start of the injection is delayed compared to if the first control mode would have been applied.

20. A method according to claim 1, wherein the at least one combustion control parameter comprises injection timing, and that the end of the injection is delayed compared to if the first control mode would have been applied.

21. A method according to claim 1, wherein the at least one combustion control parameter comprises total fuel amount per stroke, and that the amount is increased compared to if the first control mode would have been applied.

22. A method according to claim 1, wherein the at least one combustion control parameter comprises EGR rate, and that the rate is increased compared to if the first control mode would have been applied.

23. A method according to claim 1, wherein the at least one combustion control parameter comprises gaseous fuel mass flow, and that the gaseous fuel-mass flow is reduced compared to if the first control mode would have been applied.

24. A method according to claim 1, wherein the internal combustion engine is a diesel internal combustion engine and the particle filter is a diesel particle filter.

25. A method of conditioning a article filter provided for receiving exhaust gases from an internal combustion engine, wherein diesel and gaseous fuel are used as fuel during the operation of the engine, wherein the method comprises the steps of
providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to trap smaller particles is increased compared to the filling rate that would have been achieved with the first engine control mode,
temporarily applying the second engine control mode to the engine as after a regeneration of the particle filter or based on a current soot loading status,
wherein the at least one combustion control parameter comprises the diesel/gaseous fuel ratio, wherein the diesel/gaseous fuel-ratio is increased compared to if the first control mode would have been applied, and
performing a regeneration of the article filter, wherein the regeneration of the filter is a regeneration in which the temperature of the exhaust gases arriving at the filter is temporarily increased such that the particles trapped therein are consumed in a thermo chemical process and the weight of remaining particles in the regenerated filter is less or equal to 10% of the maximum weight of particles that can be trapped in the filter.

26. A method of conditioning a particle filter provided for receiving exhaust gases from an internal combustion engine, wherein diesel and gaseous fuel are used as fuel during the operation of the engine, wherein the method comprises the steps of
providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to trap smaller particles is increased compared to the filling rate that would have been achieved with the first engine control mode,
temporarily applying the second engine control mode to the engine after a regeneration of the particle filter or based on a current soot loading status,
wherein the at least one combustion control parameter comprises the diesel/gaseous fuel ratio, wherein the diesel/gaseous fuel-ratio is increased compared to if the first control mode would have been applied, and wherein the at least one combustion control parameter is altered such that the weight ratio between particles with a diameter above 50 nm and particles with a diameter below 50 nm is increased compared to if the first control mode would have been applied.

27. An internal combustion engine system, comprising at least one combustion chamber, in which internal combustion takes place, an exhaust gas-system connected to the combustion chamber, a particle filter arranged in the exhaust gas-system, and a control unit provided with software for controlling at least one combustion control parameter that affects the characteristics of particles emitted together with and carried by exhaust gas from the combustion chamber to the exhaust gas system,
wherein the software of the control unit is configured for performing a method of conditioning the particle filter provided for receiving exhaust gases from the internal combustion engine, wherein diesel and gaseous fuel are used as fuel during the operation of the engine, wherein the method comprises the steps of
providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to trap smaller particles is increased compared to the filling rate that would have been achieved with the first engine control mode, and temporarily applying the second engine control mode to the engine after a regeneration of the particle filter or based on a current soot loading status, wherein the at least one combustion control parameter comprises the diesel/gaseous fuel-ratio, wherein the diesel/gaseous fuel-ratio is increased compared to if the first control mode would have been applied.

28. A non-transitory computer program product stored on a non-transitory computer readable medium for performing, when the program is run on a computer, a method of conditioning a particle filter provided for receiving exhaust gases from an internal combustion engine, wherein diesel and gaseous fuel are used as fuel during the operation of the engine, wherein the method comprises the steps of providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the particle filter to trap smaller particles is increased compared to the filling rate that would have been achieved with the first engine control mode, and temporarily applying the second engine control mode to the engine after a regeneration of the particle filter or based on a current soot loading status, wherein the at least one combustion control parameter comprises the diesel/gaseous fuel ratio, wherein the diesel/gaseous fuel-ratio is increased compared to if the first control mode would have been applied.

29. A computer system for implementing a method of conditioning a particle filter provided for receiving exhaust gases from an internal combustion engine, wherein diesel and gaseous fuel are used as fuel during the operation of the engine, and comprising a processor operable to run a computer program for performing the steps of providing a first engine control mode and a second engine control mode, wherein in the second engine control mode at least one combustion control parameter that affects the characteristics of particles emitted together with and carried by the exhaust gases from the engine is different in relation to the first control mode such that the filling rate of the particle filter with particles that will increase the ability of the article filter to trap smaller particles is increased compared to the filling rate that would have been achieved with the first engine control mode, and temporarily applying the second engine control mode to the engine as a response to a regeneration of the particle filter or based on a current soot loading status, wherein the at least one combustion control parameter comprises the diesel/gaseous fuel ratio, wherein the diesel/gaseous fuel-ratio is increased compared to if the first control mode would have been applied.

* * * * *